Patented Sept. 21, 1943

2,329,933

UNITED STATES PATENT OFFICE 2,329,933

PLATINUM METAL CATALYST

Friedrich Franz Nord, Bronx, N. Y., assignor to Baker & Company, Inc., Newark, N. J., a corporation of New Jersey No Drawing. Application January 28, 1941, Serial No. 376,332

4 Claims. (Cl. 252—200)

This invention relates to catalysts and catalytic processes and is concerned in particular with platinum metal catalysts.

It is one object of this invention to provide a catalyst of a metal of the platinum group which shall have superior catalytic activity and performance. Other objects of this invention will be apparent from the description hereinafter following.

The catalyst according to my invention is suitable for various catalytic processes, although I have found that it is particularly useful in catalytic hydrogenation and other reduction processes. Hydrogenation processes for instance involve the reaction of organic compounds, for instance fats, oils, nitro-compounds, etc., with hydrogen, for the purpose of adding hydrogen to the organic compound, or for the purpose of reducing the organic compound with or without the simultaneous addition of hydrogen thereto. Such processes may, therefore, involve, for instance, the hydrogenation of compounds having a carbon-carbon or carbon-nitrogen double bond or the reduction of keto or aldehyde groups, processes which are of particular importance in the hydrogenation of fats and oils in the manufacture of terpenes, alkaloids, therapeutics and vitamins, as well as in the hydrogenation of unsaturated hydrocarbon compounds in the petroleum industry.

The catalyst according to this invention comprises a metal of the platinum group combined with vanadium the valency of which is less than 5. I have found that such catalysts exhibit a considerably greater catalytic activity and performance than like catalysts without such combination with such vanadium. Similarly, if it is desired to obtain a given degree of catalytic activity and performance the catalyst according to this invention may comprise less platinum metal catalyst than other catalysts as heretofore known.

In my co-pending application No. 376,331, filed January 28, 1941, I have described a catalyst comprising colloidal platinum metal accompanied by a protective colloid taken from the group of synthetic organic compounds of varying degree of polymerization, such as venyl and acrylic polymers. In such co-pending application I have described for instance such protective colloids as polyvinyl alcohol, polyacrylic acid, esters of polyacrylic acid, methyl-methacrylate, etc. A catalyst according to this invention may similarly comprise colloidal platinum metal, for instance palladium, accompanied by a protective colloid of such synthetic organic compounds of various degrees of polymerization combined with vanadium in a lower state of valency.

The catalyst according to this invention, however, is not limited to colloidal platinum metal accompanied by such synthetic protective colloid, but may also comprise colloidal platinum metal accompanied by a natural protective colloid, as well as platinum metal in non-colloidal form, so long as such catalyst metal is accompanied in action by vanadium in the manner herein described.

In a series of experiments with a solution of 1 cc. nitrobenzene, 50 cc. 50% alcohol and 1 gr. sodium hydroxide, I found for instance that with a catalyst of 10 mg. colloidal palladium and 100 mg. polyvinyl alcohol the solution consumed in 2 hours 30 cc. carbon monoxide, and that with a catalyst of 10 mg. colloidal palladium and 100 mg. polyvinyl alcohol and divalent vanadium equivalent to 5.06 mg. vanadium pentoxide, the solution consumed in the same period 43 cc. carbon monoxide.

Similarly, in experiments with a solution of 1.08 gr. quinone in a hydrochloric acid solution I found that with a catalyst of 10 mg. colloidal palladium and 250 mg. polyvinyl alcohol the solution absorbed in 10 min. 39 cc. hydrogen, and that with a catalyst of 10 mg. colloidal palladium and 250 mg. polyvinyl alcohol and trivalent and tetravalent vanadium the solution absorbed in 10 min. 141 cc. hydrogen, and that with a catalyst of 10 mg. colloidal palladium and 250 mg. polyvinyl alcohol and divalent vanadium equivalent to 9 mg. vanadium pentoxide the solution absorbed in 10 min. 174 cc. hydrogen.

In the above examples I may prepare the divalent vanadium by dissolving vanadium pentoxide in hot concentrated sulphuric acid and treating the solution with amalgamated zinc. Where a higher concentration of the ion is desired, without introducing too much acid, I may prepare the lower valent vanadium by partially dissolving vanadium pentoxide in sulphuric acid, passing sulphur dioxide into the boiling solution until the vanadium pentoxide is dissolved, displacing the sulphuric dioxide with carbon dioxide, and then standardizing the solution against potassium permanganate. The vanadium in the tetravalent condition in the above experiments was employed in the form of vanadyl sulphate. Any other means of introducing or providing vanadium in a lower state of valency may of course be employed.

The above experiments with quinone are particularly interesting in that such catalysts as for instance palladium charcoal are not capable of reducing quinone in acid solution. While a catalyst of colloidal palladium accompanied by polyvinyl alcohol is capable of performing the reduction it will be noted that the catalyst according to this invention has a considerably greater speed without showing any tendency to weaken in activity.

It is debatable whether the increased degree of catalytic activity observed in the case of the catalysts according to this invention is due to combined action of the platinum metal and the vanadium of lower valency, or to an increased action of the platinum metal in the presence of the vanadium of lower valency, but in any case the catalyst of platinum metal accompanied by lower valent vanadium exhibits greater catalytic activity and better catalytic performance than a like catalyst of platinum metal not accompanied by such vanadium the valency of which is lower than 5.

While I have described only experiments with palladium it should be understood that the invention is equally applicable to other metals of the platinum group. Experiments with platinum for instance have shown substantially the same advantages over catalysts of platinum as heretofore known as were observed in the experiments above described.

What I claim is:

1. A catalyst comprising a colloidal solution of metal of the platinum group, a soluble vanadium compound wherein the vanadium has a valency of less than 5, and a protective colloid, said vanadium compound and said protective colloid being dissolved in said colloidal solution.

2. A catalyst comprising a colloidal solution of metal of the platinum group, a soluble vanadium compound wherein the vanadium has a valency of less than 5, and a synthetic organic polymer which acts as a protective colloid, said vanadium compound and said protective colloid being dissolved in said colloidal solution.

3. A catalyst comprising a colloidal solution of palladium, a soluble vanadium compound wherein the vanadium has a valency of less than 5, and a synthetic organic polymer which acts as a protective colloid, said vanadium compound and said protective colloid being dissolved in said colloidal solution.

4. A catalyst comprising a colloidal solution of palladium, a soluble vanadium compound wherein the vanadium has a valency of less than 5, and polyvinyl alcohol, said vanadium compound and said polyvinyl alcohol being dissolved in said colloidal solution.

FRIEDRICH FRANZ NORD.